under various headings in the Patent Office

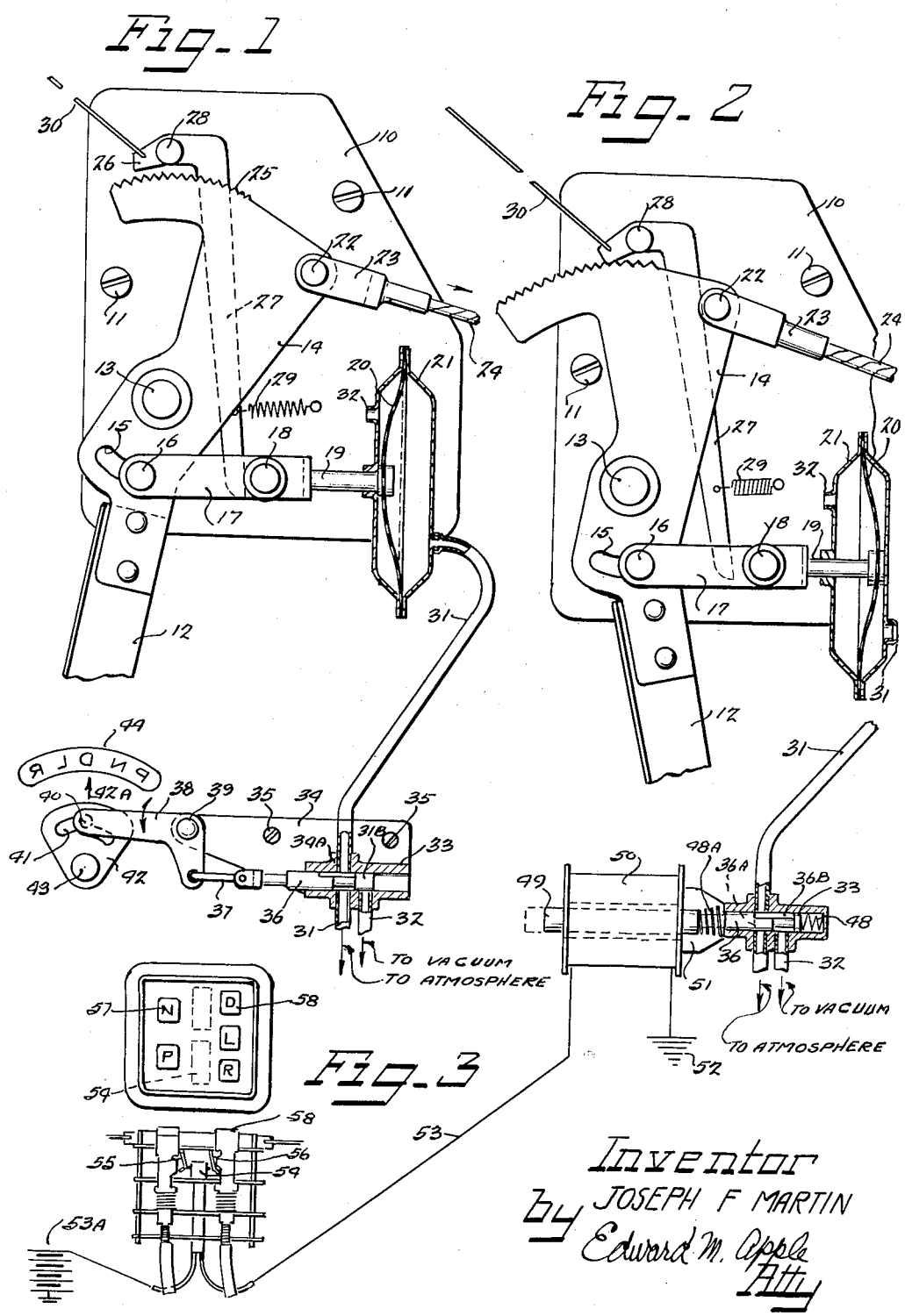

United States Patent Office
2,867,310
Patented Jan. 6, 1959

2,867,310

VACUUM ACTUATOR FOR FOOT OPERATED EMERGENCY BRAKE

Joseph F. Martin, Detroit, Mich., assignor to Mabel M. Martin, Detroit, Mich., and himself, as tenants by the entireties with full rights of survivorship Application December 24, 1956, Serial No. 630,406

2 Claims. (Cl. 192—4)

This invention relates to automotive vehicles and particularly to an emergency brake mechanism for the same.

An object of the invention is to provide automatic, power means, for setting and releasing the foot lever type of emergency brake of an automotive vehicle, and this application may be considered a continuation in part, of my co-pending application Serial Number 561,858, filed January 27, 1956, now Patent No. 2,821,275, dated January 28, 1958. The invention herein disclosed also may be considered an improvement on the inventions disclosed in my issued patents Numbers 2,725,128, 2,725,129, 2,725,130 and 2,725,131.

In the patents previously issued to me, the numbers of which are hereinabove set out, I disclosed automatic means for setting and releasing the conventional, hand, push-pull type of emergency brake mechanisms. In my co-pending application, Serial Number 561,858, filed January 27, 1956, and in this application, I disclose automatic, power means, for setting and releasing a conventional, foot operated, lever type of emergency brake mechanism, combined with both, the steering column type of speed selector mechanism, and the so-called "push button drive" type of speed selector mechanism, used to control an automatic transmisison.

In my co-pending application hereinabove referred to, I disclose specific power means, for shifting and releasing the foot lever type of emergency brake, and certain of the claims made in the said co-pending application may be considered generic to the specific means herein disclosed.

Another object of the invention is to provide an automatic, power operated, emergency brake, with means for manual control, in the event of a power failure.

Another object of the invention is to provide an automatic, power operated emergency brake, with means to permit the moving of the vehicle, if desired, when the transmission is in neutral.

Another object of the invention is to provide automatic, power means for engaging and disengaging the foot lever type of emergency brake, which means may readily be installed on old or new motor vehicles, equipped with conventional brake mechanisms and automatic transmissions.

Another object of the invention is to provide means for automatically engaging, and disengaging the emergency brake, simultaneously with the changing of the position of the transmission speed selector mechanism.

Another object of the invention is to provide automatic, vacuum, power means for engaging and releasing the foot lever type emergency brake mechanism, which vacuum, power means are controlled by the manual operation of selecting a predetermined position, on the automatic transmission control mechanism, without in any way, interfering with the normal functioning of the automatic transmission.

The foregoing and other objects and advantages of the invention will become more apparent as the description proceeds, reference being made from time to time to the accompanying drawings, forming part of the within disclosure, in which drawings:

Fig. 1 is an elevational view of a vacuum operated, foot lever type of, emergency brake control, used with motor vehicles having a steering column type of transmission speed selector control. This view shows the emergency brake in "off" position.

Fig. 2 is a view similar to Fig. 1, but shows the emergency brake in "on" position. In this view, however, the vacuum mechanism is electrically controlled, through means connected to a "push button" type of speed selector.

Fig. 3 is a diagrammatic view, with parts in section, of a "push button" type of automatic transmission speed selector control, with electrical means combined therewith, for controlling the vacuum emeregency brake actuator illustrated in Fig. 2.

Referring now more particularly to the drawings, it will be understood that in the embodiment herein disclosed, the reference character 10 indicates a mounting plate, which is secured by means of screws 11, to a part of the body, or frame (not shown) of a motor vehicle, equipped with a foot lever operated emergency brake, and an automatic transmission, and provided with one or the other of the speed selector mechanisms, such as disclosed in Fig. 1 and in Fig. 3.

The mounting plate 10 is positioned, in conventional manner, on the driver's side of the vehicle for convenient manipulation by the driver, of the foot lever 12, which is pivoted, as at 13, to the mounting plate 10. The foot lever 12 consists of a length of heavy metal, preferably of T shaped cross-section, to which is secured, by any suitable means, a bearing plate 14 and a foot piece (not shown). The bearing plate 14 has formed therein a slot 15, in which is adapted to ride a pivot pin 16, which suports one end of a pair of links 17, the opposite ends of which connect, as at 18, with a push-pull rod 19, which is secured to the diaphragm 20, which is mounted in a suction device 21. The slot 15, in the plate 14, is shaped and positioned, so that the lever 12 may be manually operated by the foot of the vehicle driver, in the event of a power failure, or the like.

The bearing plate 14 is pivoted, as at 22, to a clevis 23, which in turn is connected to the emergency brake cable 24, which in conventional practice is spring loaded. The bearing plate 14 is provided with a series of ratchet teeth along its upper edge as at 25, which teeth are adapted to be engaged by the locking pawl 26, formed on one end of the locking arm 27, which is pivoted, as at 28, to the mounting plate 10. The lower end of the arm 27 is spring loaded, as at 29, so that the arm 27 is normally urged into locking position by means of the spring 29. The arm 27 is moved out of locking position by means of the pivot pin 18 and the "push-pull" rod 19, as the linkage 17 is moved to the left as shown in Fig. 1. The arms 27 may also be moved out of locking position by means of the hand pull 30, in the event of a power failure.

The suction device 21 is connected through the pipes 31 and 32, to and through a vacuum control valve 33, respectively to atmosphere and to a source of vacuum power (not shown). The vacuum control valve 33 is mounted on a bracket 34, which in turn is secured by screws 35, or other suitable means, to a permanent part of the motor vehicle. The valve 33 is provided with a plunger 36, which is connected by linkage 37, to a bell crank 38, which is pivoted as at 39, on the bracket 34. The bell crank 38 is provided with a cam 40, which rides in a cam slot 41, formed in a cam plate 42, which is mounted, as at 43, on the shift rod, or the speed selector rod, of the automatic transmission control mechanism, the various selective positions of which are indicated on the dial 44, which comprises part of the automatic transmission speed selector mechanism illustrated in Fig. 1. The plunger 36 is provided with passage ways 36A and 36B, so that the suction device 21 may alternately be connected to the atmosphere and to the source of vacuum power (not shown), through the pipes 31 and 32, whereby the emergency brake lever may be moved to "off" and "on" positions.

The device functions as follows:

The shape of the cam slot 41 is such that when the shift rod 43 is moved in either direction, between drive (D), low (L) and reverse (R) positions, no movement takes place in the bell crank 38, consequently there is no movement in the valve plunger 36, so that the suction device 21 is open to atmosphere, as shown in Fig. 1, whereby the bearing plate 14 and foot lever 12 are moved into the "off" position shown in Fig. 1, under the influence of the spring loaded cable 24.

When the shift rod 43 is moved, so that the pointer 42A on the cam plate 42 moves to neutral (N), or park (P), the cam slot 41 will cause the bell crank 38 to move in the direction indicated by the arrow on the bell crank 38, which in turn will pull the plunger 36 to the left, causing communication between the suction device 21 and the source of vacuum (not shown), which in turn causes the diaphragm 20 to move to the right as shown in Fig. 2, pulling with it the push-pull rod 19 and the linkage 17, which causes the foot lever 12 and bearing plate 14 to move the emergency brake into "on" position, as shown in Fig. 2, and permitting the spring 29 to pull the locking arm 27 to the right, causing the locking pawl 26 to engage the ratchet teeth 25 to lock the foot lever 12 in "on" position.

In the modification shown in Fig. 2, the plunger 36 is spring backed, as at 48 and 48A, and is secured to the armature 49, of a solenoid 50, which is secured, as at 51, to the valve housing 33. The solenoid 50 is grounded, as at 52, and is electrically connected, as at 53, to the contact member of a switch 54, which in turn is connected, as at 53A to the storage battery, or into the electrical system of the vehicle. The switch member 54 is adapted to be contacted by either members 55 or 56, to close and open the circuit through the solenoid 50, when the push buttons 57 or 58 are pushed, as is more fully described in my said co-pending application, otherwise the device functions as previously described.

Having described my invention, what I claim and desire to secure by Letters Patent is:

1. In a motor vehicle, having an emergency brake mechanism, including a foot lever for actuating the emergency brake pull cable, and a transmission control mechanism, the combination of a member secured to one end of said foot lever and movable therewith, means connecting said member to said cable, a vacuum device having a diaphragm therein, one side of which device may be opened to atmosphere, and the other side of which device is connectible to a source of vacuum, means connecting said diaphragm to said member, a control valve interposed between said vacuum device and the atmosphere and said source of vacuum, and means responsive to the movement of said transmission control mechanism for controlling said valve, said first named member having ratchet teeth formed on one edge, a locking pawl pivoted near said member and positioned to engage and disengage said teeth, an extension on said pawl in contacting relation with means attached to said diaphragm, whereby to move said pawl in one direction upon the movement of said diaphragm in one direction, and for moving said pawl in the opposite direction, upon the movement of said diaphragm in that direction.

2. In a motor vehicle, having an emergency brake mechanism, including a foot lever for actuating the emergency brake pull cable, and a transmission control mechanism, the combination of a member secured to one end of said foot lever and moveable therewith, means connecting said member to said cable, a vacuum device having a diaphragm therein, one side of which device may be opened to atmosphere, and the other side of which device is connectible to a source of vacuum, means connecting said diaphragm to said member, a control valve interposed between said vacuum device and the atmosphere and said source of vacuum, and means responsive to the movement of said transmission control mechanism for controlling said valve, said valve control means comprising a spring loaded reciprocable plunger and a solenoid, said plunger being connected to the armature of said solenoid, said solenoid being connected to the electrical system of the vehicle, there being electrical make and break circuit means in said electrical system, which are actuated by the movement of the "push buttons" comprising part of the said transmission control mechanism.

References Cited in the file of this patent
UNITED STATES PATENTS

| | | |
|---|---|---|
| 1,887,428 | Powell | Nov. 8, 1932 |
| 1,964,764 | Lippert | July 3, 1934 |
| 2,079,978 | Weiss | May 11, 1937 |
| 2,725,128 | Martin | Nov. 29, 1955 |